US007680785B2

(12) United States Patent
Najork

(10) Patent No.: US 7,680,785 B2
(45) Date of Patent: Mar. 16, 2010

(54) SYSTEMS AND METHODS FOR INFERRING UNIFORM RESOURCE LOCATOR (URL) NORMALIZATION RULES

(75) Inventor: Marc Alexander Najork, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 11/089,988

(22) Filed: Mar. 25, 2005

(65) Prior Publication Data

US 2006/0218143 A1    Sep. 28, 2006

(51) Int. Cl.
 G06F 17/30 (2006.01)
 G06F 17/00 (2006.01)
 G06F 17/20 (2006.01)
(52) U.S. Cl. .................. 707/5; 707/6; 707/7; 707/100; 707/200
(58) Field of Classification Search ........................ None
 See application file for complete search history.

(56) References Cited

U.S. PATENT DOCUMENTS

| | | | | |
|---|---|---|---|---|
| 5,999,929 | A * | 12/1999 | Goodman | 707/7 |
| 6,654,741 | B1 * | 11/2003 | Cohen et al. | 707/6 |
| 6,718,333 | B1 * | 4/2004 | Matsuda | 707/102 |
| 7,137,065 | B1 * | 11/2006 | Huang et al. | 715/513 |
| 7,185,088 | B1 * | 2/2007 | Joy et al. | 709/224 |
| 2003/0046311 | A1 * | 3/2003 | Baidya et al. | 707/200 |
| 2004/0177015 | A1 * | 9/2004 | Galai et al. | 705/35 |
| 2005/0165800 | A1 * | 7/2005 | Fontoura et al. | 707/100 |
| 2006/0095422 | A1 * | 5/2006 | Kikuchi | 707/3 |

OTHER PUBLICATIONS

Slawski, "Microsoft Creating Rules for Canonical URLs," Sep. 29th, 2006, pp. 1-5.*

(Continued)

*Primary Examiner*—John R Cottingham
*Assistant Examiner*—Hexing Liu
(74) *Attorney, Agent, or Firm*—Woodcock Washburn LLP

(57) ABSTRACT

Different URLs that actually reference the same web page or other web resource are detected and that information is used to only download one instance of a web page or web resource from a web site. All web pages or web resources downloaded from a web server are compared to identify which are substantially identical. Once identical web pages or web resources with different URLs are found, the different URLs are then analyzed to identify what portions of the URL are essential for identifying a particular web page or web resource, and what portions are irrelevant. Once this has been done for each set of substantially identical web pages or web resources (also referred to as an "equivalence class" herein), these per-equivalence-class rules are generalized to trans-equivalence-class rules. There are two rule-learning steps: step (1), where it is learned for each equivalence class what portions of the URLs in that class are relevant for selecting the page and what portions are not; and step (2), where the per-equivalence-class rules constructed during step (1) are generalized to rules that cover many equivalence classes. Once a rule is determined, it is applied to the class of web pages or web resources to identify errors. If there are no errors, the rule is activated and is then used by the web crawler for future crawling to avoid the download of duplicative web pages or web resources.

19 Claims, 4 Drawing Sheets

OTHER PUBLICATIONS

Schonfeld, "Do Not Crawl in the DUST: Different URLs with Similar Text Extended," May 22-26, 2006, ACM, pp. 1-2.*

Fetterly, Dennis, et al., "On the Evolution of Clusters of Near-Duplicate Web Pages", *Proceedings of the First* ($1^{st}$) *Latin American Web Congress, Santiago, Chile*, Nov. 2003, 9 pages, http://research.microsoft.com/research/sv/PageTurner/laweb.pdf.

* cited by examiner

SYSTEMS AND METHODS FOR INFERRING UNIFORM RESOURCE LOCATOR (URL) NORMALIZATION RULES

FIELD OF THE INVENTION

The present invention relates generally to the field of web crawlers, and, more particularly, to inferring uniform resource locator (URL) normalization rules for substantially identical web resources having different URLs.

BACKGROUND OF THE INVENTION

The World Wide Web is a large, distributed, decentralized collection of documents. Documents (often referred to as "web resources" or "web pages") can be downloaded from computers called "web servers"; there are tens of millions of web servers serving billions of web pages. Each web page is identified by a uniform resource locator (URL). A URL is of the form http://host:port/path where the host component identifies the web server that serves the document associated with the URL, and the path component provides a name for that document relative to the host. The port component identifies the networking "port" (an Internet abstraction used to multiplex different logical communication channels over the same physical networking device) used by the web server running the specified host; if the port is omitted, it defaults to 80.

Web crawlers traverse web sites and download all pages referenced by the URLs of the web site. However, many web sites use different URLs to reference the same web page or document, for various reasons. It is quite common for the same document to be identified by several and possibly many URLs. For example, the following sixteen URLs, although all different, all refer to substantially the same web page:

1. http://www.marketwatch.com/news/yhoo/story.asp?source=blq/yhoo&siteid=yhoo&dist=yhoo&guid=%7B5D426EE8%2DBB62%2D457C%2DA82E%2D05EE3F6F16C8%7D
2. http://www.marketwatch.com/news/story.asp?source=blq/yhoo&siteid=yhoo&dist=yhoo&guid=%7B5D426EE8%2DBB62%2D457C%2DA82E%2D05EE3F6F16C8%7D
3. http://www.marketwatch.com/news/yhoo/story.asp?siteid=yhoo&dist=yhoo&guid=%7B5D426EE8%2DBB62%2D457C%2DA82E%2D05EE3F6F16C8%7D
4. http://www.marketwatch.com/news/yhoo/story.asp?source=blq/yhoo&dist=yhoo&guid=%7B5D426EE8%2DBB62%2D457C%2DA82E%2D05EE3F6F16C8%7D
5. http://www.marketwatch.com/news/yhoo/story.asp?source=blq/yhoo&siteid=yhoo&guid=%7B5D426EE8%2DBB62%2D457C%2DA82E%2D05EE3F6F16C8%7D
6. http://www.marketwatch.com/news/yhoo/story.asp?source=blq/yhoo&guid=%7B5D426EE8%2DBB62%2D457C%2DA82E%2D05EE3F6F16C8%7D
7. http://www.marketwatch.com/news/yhoo/story.asp?siteid=yhoo&guid=%7B5D426EE8%2DBB62%2D457C%2DA82E%2D05EE3F6F16C8%7D
8. http://www.marketwatch.com/news/yhoo/story.asp?dist=yhoo&guid=%7B5D426EE8%2DBB62%2D457C%2DA82E%2D05EE3F6F16C8%7D
9. http://www.marketwatch.com/news/story.asp?source=blq/yhoo&siteid=yhoo&guid=%7B5D426EE8%2DBB62%2D457C%2DA82E%2D05EE3F6F16C8%7D
10. http://www.marketwatch.com/news/story.asp?source=blq/yhoo&dist=yhoo&guid=%7B5D426EE8%2DBB62%2D457C%2DA82E%2D05EE3F6F16C8%7D
11. http://www.marketwatch.com/news/story.asp?siteid=yhoo&dist=yhoo&guid=%7B5D426EE8%2DBB62%2D457C%2DA82E%2D05EE3F6F16C8%7D
12. http://www.marketwatch.com/news/yhoo/story.asp?guid=%7B5D426EE8%2DBB62%2D457C%2DA82E%2D05EE3F6F16C8%7D
13. http://www.marketwatch.com/news/story.asp?source=blq/yhoo&guid=%7B5D426EE8%2DBB62%2D457C%2DA82E%2D05EE3F6F16C8%7D
14. http://www.marketwatch.com/news/story.asp?siteid=yhoo&guid=%7B5D426EE8%2DBB62%2D457C%2DA82E%2D05EE3F6F16C8%7D
15. http://www.marketwatch.com/news/story.asp?dist=yhoo&guid=%7B5D426EE8%2DBB62%2D457C%2DA82E%2D05EE3F6F16C8%7D
16. http://www.marketwatch.com/news/story.asp?guid=%7B5D426EE8%2DBB62%2D457C%2DA82E%2D05EE3F6F16C8%7D These web pages are therefore downloaded duplicatively by a web crawler. This is a concern as superfluous downloads waste bandwidth and computational resources of both the web server (operated by the web content provider) and the web crawler (operated by the search engine). Such wasteful behavior is undesirable.

Web crawlers can download only a finite number of documents or web pages in a given amount of time. Therefore, it would be advantageous if a web crawler could identify URL equivalence patterns in multiple different URLs that reference substantially identical pages and download only one document, as opposed to downloading all the substantially identical documents addressed by the multiple different URLs.

In view of the foregoing, there is a need for systems and methods that overcome such deficiencies.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

Embodiments of the invention are directed to predicting when different URLs actually reference the same document or web resource, and then using that information to only download one instance of a document or web resource from a web site.

According to aspects of the invention, an exemplary method compares all the web resources on a web site to identify whether two resources downloaded from a web site are identical or near identical. Example tests for comparing include, but are not limited to, determining whether two pages are completely identical, determining whether the non-markup words (as opposed to the HTML markup) on two pages are identical, or determining whether two pages are very similar (e.g., share a predetermined percentage of their content, such as 95% of their content). Once identical (or near identical) web resources with different URLs are found, the different URLs are then analyzed to identify what portions of the URL are essential for identifying a particular web resource, and what portions are irrelevant. Once this has been done for each set of substantially identical web resources (also referred to as an "equivalence class" herein), these per-equivalence-class rules are generalized to trans-equivalence-class rules.

According to further aspects of the invention, there are two rule-learning steps: step (1), where it is learned for each equivalence class what portions of the URLs in that class are relevant for selecting the page and what portions are not; and step (2), where the per-equivalence-class rules constructed during step (1) are generalized to rules that cover many equivalence classes on a given web server. Once a rule is determined, it is applied to the class of web resources to identify errors. If there are no errors, the rule is activated and is then used by the web crawler for future crawling to avoid the download of duplicative web resources.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Aspects of the present invention are directed to identifying URLs that address substantially identical documents on the same web server, and then inferring per-web server rewriting rules for transforming URLs into canonical URLs addressing substantially identical documents.

Figure 1:
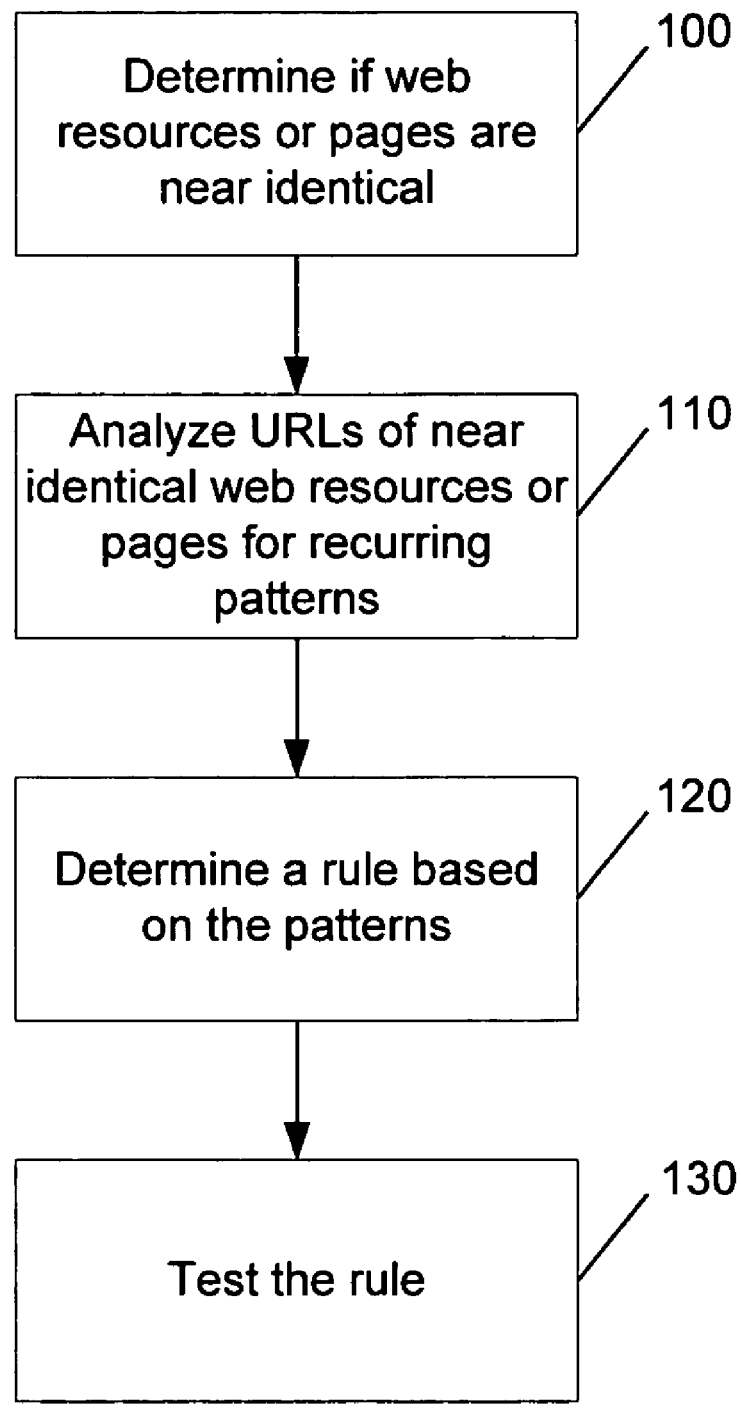
FIG. 1 is a high level flow diagram of an exemplary method of identifying duplicate documents, web resources, or web pages in accordance with the present invention.

FIG. 1 is a high level flow diagram of an exemplary method of identifying duplicate documents, web resources, or web pages in accordance with the present invention. At step 100, all the web pages downloaded by the web crawler from a given web server are examined to identify all pages that are near identical (i.e., substantially identical). This could be performed by various techniques, such as shingling, checksumming, lexical comparison, etc., for example. The content of the page is compared, not merely the URL. This step is repeated for the documents or web pages being tested. The documents, web resources, or web pages desirably correspond to a text document, an image, an audio file, and/or a video file, for example, but are not limited thereto.

At step 110, the URLs of the web pages that have been determined to be substantially identical are then analyzed for recurring patterns. For example, in which the following sixteen URLs all refer to substantially the same web page:

http://www.marketwatch.com/news/yhoo/story.asp?source=blq/yhoo&siteid=yhoo&dist=yhoo&guid=%7BD426EE8%2DBB62%2D457C%2DA82E%2D05EE3F6F16C8%7D http://www.marketwatch.com/news/story.asp?source=blq/yhoo&siteid=yhoo&dist=yhoo&guid=%7B5D426EE8%2DBB62%2D457C%2DA82E%2D05EE3F6F16C8%7D http://www.marketwatch.com/news/yhoo/story.asp?siteid=yhoo&dist=yhoo&.uid=%7B5D426EE8%2DBB62%2D457C%2DA82E%2D05EE3F6F16C8%7D http://www.marketwatch.com/news/yhoo/story.asp?source=blq/yhoo&dist=yhoo&guid=%7B5D426EE8%2DBB62%2D457C%2DA82E%2D05EE3F6F16C8%7D http://www.marketwatch.com/news/yhoo/story.asp?source=blq/yhoo&siteid=yhoo&guid=%7B5D426EE8%2DBB62%2D457C%2DA82E%2D05EE3F6F16C8%7D http://www.marketwatch.com/news/yhoo/story.asp?source=blq/yhoo&guid=%7B5D426EE8%2DBB62%2D457C%2DA82E%2D05EE3F6F16C8%7D http://www.marketwatch.com/news/yhoo/story.asp?siteid=yhoo&guid=%7B5D426EE8%2DBB62%2D457C%2DA82E%2D05EE3F6F16C8%7D http://www.marketwatch.com/news/yhoo/story.asp?dist=yhoo&guid=%7B5D426EE8%2DBB62%2D457C%2DA82E%2D05EE3F6F16C8%7D http://www.marketwatch.com/news/story.asp?source=blq/yhoo&siteid=yhoo&guid=%7B5D426EE8%2DBB62%2D457C%2DA82E%2D05EE3F6F16C8%7D http://www.marketwatch.com/news/story.asp?source=blq/yhoo&dist=yhoo&guid=%7B5D426EE8%2DBB62%2D457C%2DA82E%2D05EE3F6F16C8%7D http://www.marketwatch.com/news/story.asp?siteid=yhoo&dist=yhoo&puid=%7B5D426EE8%2DBB62%2D457C%2DA82E%2D05EE3F6F16C8%7D http://www.marketwatch.com/news/yhoo/story.asp?guid=%7B5D426EE8%2DBB62%2D457C%2DA82E%2D05EE3F6F16C8%7D http://www.marketwatch.com/news/story.asp?source=blq/yhoo&guid=%7B5D426EE8%2DBB62%2D457C%2DA82E%2D05EE3F6F16C8%7D http://www.marketwatch.com/news/
　　story.asp?siteid=yhoo&guid=%7B5D426EE8%2DB
　　B62%2D457C%2DA82E%2D05EE3F6F16C8%7D
http://www.marketwatch.com/news/
　　story.asp?dist=yhoo&guid=%7B5D426EE8%2DBB
　　62%2D457C%2DA82E%2D05EE3F6F16C8%7D
http://www.marketwatch.com/news/
　　story.asp?guid=%7B5D426EE8%2DBB62%2D457C
　　%2DA82E%2D05EE3F6F16C8%7D, it is noted that the URL comprises a number of components, only some of which are needed to identify the web page, with the others being related to co-branding, for example. Enclosing optional components into square brackets, the URLs can be described as follows:

http://www.marketwatch.com/news/[yhoo/]story.asp?
　　[source=blq/yhoo&][siteid=yhoo&][dist=yhoo&]
　　guid=%7B5D426EE8%2DBB62%2D457C%2DA82E
　　%2D05EE3F6F16C8%7D.

Upon examining other URLs identifying documents on a web site, it is found that there are many similar URLs that follow a similar pattern, where multiple URLs identify substantially the same web page. These patterns are typically specific to a particular web site; that is, the patterns that describe multiple URLs identifying the same document or web page do not apply to all web sites in general.

At step 120, a URL normalization rule is determined based on the patterns. A rule matches some URLs, and transforms each matching URL into a normalized URL. Two URLs that are transformed to the same normalized URL are predicted to refer to substantially identical web pages.

Figure 2:
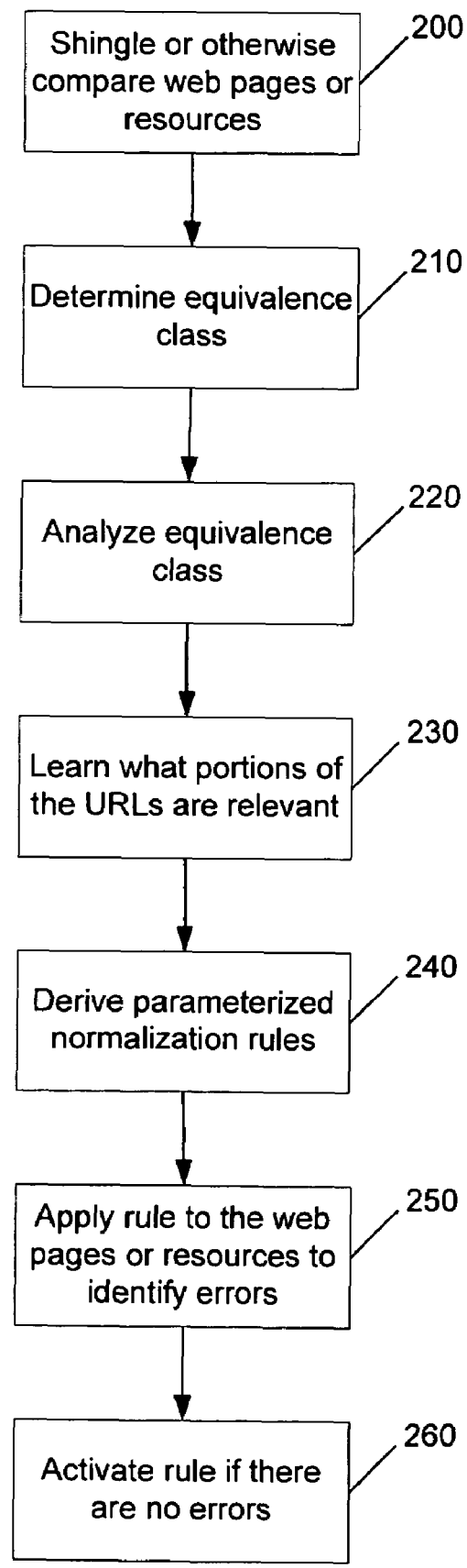
FIG. 2 is a flow diagram of another exemplary method of identifying duplicate documents, web resources, or web pages in accordance with the present invention.

This rule may then be tested, at step 130. Testing may involve, for example, applying the rule to various URLs, and then determining if the ones predicted to have substantially identical content are, in fact, substantially identical. If the test fails for any URL, the rule is marked as rejected. If the test succeeds for more than a certain threshold number of URLs and does not fail for any URL, the rule is marked as accepted and subsequently used to normalize URLs processed by the web crawler. The rule may be applied to subsequent web page crawling, to reduce the number of substantially identical pages that are downloaded FIG. 2 is a flow diagram of an exemplary method of identifying duplicate web pages or web resources in accordance with the present invention. At step 200, all web pages downloaded by the web crawler from a given web site are "shingled" or otherwise compared (using check-summing, lexical comparison, etc., for example) to identify which pages downloaded from a web site are identical or substantially identical.

More particularly, in accordance with an embodiment, the web pages or resources downloaded by the search engine's web crawler are shingled. The term "shingling" refers to a conventional feature extraction algorithm, and is described for example in D. Fetterly, M. Manasse, and M. Najork, "On the Evolution of Clusters of Near-Duplicate Web Pages", *Proceedings of the First Latin American Web Congress,* Santiago, Chile, November 2003, and is incorporated herein by reference in its entirety. An example shingling algorithm may reduce each document to a vector of 15 "megashingles"; two documents that are 95% similar have a 90% probability of having at least one megashingle in common, while documents that are merely 80% similar just have a 2.6% probability of having one or more megashingles in common. Shingling provides a convenient way of testing whether two documents are near identical.

Shingling is one way to determine whether two pages or resources are substantially identical, but there are many other techniques. For example, one might use the Unix tool "diff" (which compares two text documents and outputs all the lines that differ between them) to pair-wise compare all pages downloaded from a web server. Alternately, one could compute a hash value (e.g., an MD5 checksum or a Rabin fingerprint) of each page downloaded from a web server (either the entire page or just the non-markup words) and add the hash value and the corresponding URL to a table. Whenever the same hash value maps to more than one URL, these URLs identify (with high probability, subject to the quality of the hash function) identical web pages. Another possible way to compare all pages on a web server is to reduce each page to a set of "rare" words occurring in that page (the assumption being that if two pages contain the same rare words, they must be highly similar). Additional techniques are contemplated.

The web pages downloaded from a particular web server may be grouped into equivalence classes, where each equivalence class contains the URLs of all the documents on a particular web server that are near identical to one another, or, if shingling is used to determine which documents are substantially identical, that have at least one megashingle in common.

One way to do this (e.g., if memory is scarce) is to bucketize the URLs and their associated megashingles in such a way that there is one bucket per host, and all URLs referring to that host (and their associated megashingles) are placed in that bucket. It is noted that bucketizing URLs is independent of whether shingling or any other mechanism for comparing web pages coming from the same server is used. Then, the buckets are examined, one bucket at a time. For each URL in that bucket, its megashingles (e.g., 15 megashingles, using an example shingling algorithm) are added to the hash tables (e.g., 15 hash tables, one for each position in the megashingle vector, in this example). Each hash table desirably maintains a list of all URLs on that web server which have an identical megashingle. Once all the URLs in a bucket have been processed, the hash tables are examined, and for any megashingle that maps to more than one URL, the URLs are recorded. These URLs form an equivalence class, at step 210.

After identical (or near identical) web pages with different URLs are found (e.g., grouped into an equivalence class), the different URLs in the equivalence class are then analyzed at step 220 to determine which portions of the URL are relevant for identifying the web page.

At this point, it is contemplated that there may be two distinct learning steps—the first trying to find a canonical representative for all URLs in an equivalence class (where the canonical representative does not need to be in the equivalence class, and thus is not even guaranteed to be a working URL); the second trying to identify similar canonical representatives, make the portions that differ into one or more variables, and use these variables in both the left-hand sides and the right-hand sides of the URL rewriting rules.

More particularly, an embodiment of the invention comprises two learning steps. In the first step (step 230), it attempts to learn what portions of the URLs within an equivalence class of substantially identical documents are relevant and which portions are not. In other words, the URLs contained in an equivalence class of substantially similar documents are analyzed for the presence of shared properties. These shared properties are assumed to be relevant to identifying the document returned by the web server, while non-shared properties are deemed irrelevant.

At the end of this stage, one "canonical" URL per equivalence class is provided. No connections between the various equivalence classes coming from the given web server have been made yet. In the second stage (step 240), normalized URLs are compared and parameterized normalization rules that work across equivalence classes are derived.

A more detailed description of this embodiment would be:
  a. Segment each URL (without the http:://, the host name, and the optional port) into pieces, where each piece is separated by a '/', a ';', an '?', or a '&', and group the pieces into a multiset. For example, the URL http://www.informationweek.com/showArticle.jhtml;
jsessionid=05YISK4Q0PJQCQSNDBCCK
H0CJUMEKJVN?articleID=60401364 would be segmented into the multiset

{showArticle.jhtml,
jsessionid=05YISK4Q0PJQCQSNDBCCKH0CJUMEKJV
N, articleID=60401364}, and the URL http://www.informationweek.com/
showArticle.jhtml?articleID=60401364&tid=5999

(which identifies a substantially identical web page) would be segmented into the multiset {showArticle.jhtml, articleID=60401364, tid=5999}.
  b. Intersect the segment multisets of all the URLs in the equivalence class, and take the URL that is composed of the segments in the intersection (in the order in which they occurred in, say, the shortest URL in the equivalence class) as the normalized URL. In the above example, the intersection of the two segment multisets would be {showArticle.jhtml, articleID=60401364}, and the normalized URL would be http://www.informationweek.com/showArticle.jhtml?articleID=60401364.
  c. Based on this canonical URL (and using the knowledge that URL portions of the form "key=val" denote key-value pairs), generate rewrite rules, such as:
    http://www.informationweek.com/showArticle.jhtml;
      jsessionid=*?articleID=60401364→
    http://www.informationweek.com/showArticle.jhtml?articleID=60401364
    http://www.informationweek.com/
      showArticle.jhtml?articleID=60401364&tid=*→
    http://www.informationweek.com/showArticle.jhtml?articleID=60401364.
  d. Compare the right-hand sides of the rewrite rules of associated with different equivalence classes, and generalize rules that have similar right-hand sides by parameterizing them. For example, the system might have seen another equivalence class where the canonical URL was similar, but had a different articleID. The system would then generalize these rules, marking the value of articleID a variable (say α):
    http://www.informationweek.com/showArticle.jhtml;
      jsessionid=*?articleID=α→
    http://www.informationweek.com/
      showArticle.jhtml?articleID=α
    http://www.informationweek.com/
      showArticle.jhtml?articleID=α&tid=*→
    http:H/www.informationweek.com/
      showArticle.jhtml?articleID=α

It is contemplated that there are other heuristics for canonicalizing the URLs in an equivalence class. For example, there may be cases where some segments are case-insensitive.

According to another embodiment, the equivalence class may be analyzed to determine the portion of the string that is common to all URLs, and that is labeled as the prefix. The suffix may then be analyzed to determine the portions that have no effect on the identity of the referenced web page. After disregarding the non-essential portions of the suffix, the remainder may be analyzed to identify how a web page is uniquely identified.

Thus, according to an embodiment, the URLs in each equivalence class may be examined for shared prefixes and suffixes. For example, if an equivalence class contains the URLs:
  http://www.amazon.fr:80/exec/obidos/ASIN/
    2011679095/qid=1038378294/br=1-13/ref=br__1f_b__
    12/
  http://www.amazon.fr:80/exec/obidos/ASIN/
    2011679095/ref=br__1f_b__12/, it will be determined that the first URL can be transformed into the second URL by omitting the "qid=1038378294/" portion of the first URL. As a second example, if an equivalence class contains the six URLs:
  http://www.amazon.fr:80/exec/obidos/ASIN/
    270960681X/qid=1038383073/sr=1-12/ref=sr__1__3__
    12/
  http://www.amazon.fr:80/exec/obidos/ASIN/
    270960681X/qid=1038383104/sr=1-12/ref=sr__1__3__
    12/
  http://www.amazon.fr:80/exec/obidos/ASIN/
    270960681X/qid=1038383420/br=1-12/ref=br__
    1f_b__11/
  http://www.amazon.fr:80/exec/obidos/ASIN/
    270960681X/qid=1038383490/br=1-12/ref=br__
    1f_b__11/
  http://www.amazon.fr:80/exec/obidos/ASIN/
    270960681X/qid=1038383596/sr=1-10/ref=sr__1__2__
    10/
  http://www.amazon.fr:80/exec/obidos/ASIN/
    270960681X/ref=br__1f_b__11/, it will be determined that the six URLs share a common prefix, namely:
  http://www.amazon.fr:80/exec/obidos/ASIN/
    270960681X/, which is a candidate canonical UTRL for that document.

This may be performed by, for example, for each URL in the same equivalence class, viewing each slash as a field separator. The URLs are segmented into multisets of fields, the multisets are intersected, and the canonical URL is derived from this intersection.

By examining a sufficiently large number of URLs on a particular web site, it can be learned which per-equivalence-class rewriting rules generalize to the entire site. For example, for the web site used in the example above, it will desirably be learned that the pattern http://www.amazon.fr:80/exec/obidos/ASIN/some-number identifies a distinct page, but that the qid=some-number and ref=some-string portions are optional and do not influence the web page that is being downloaded. In other words, the URL is normalized.

Once a rule is determined, it is applied to the class of web pages to identify errors, at step 250. This rule may then be tested by, for example, applying the rule to various URLs, and then determining if the ones predicted to have substantially identical content are, in fact, substantially identical. If there are no errors, the rule is activated at step 260 and may then be used by the web crawler for future crawling to avoid the download of duplicative web pages.

The rules learned for a particular web site may be desirably validated against the documents that have been downloaded from that web site so far (possibly within a bounded time interval, to deal with the fact that URL naming schemes may change over time). If there are any counterexamples (that is, web pages that are dissimilar despite the fact that the inferred URL normalization rules predict that they should be near identical), the rule may be marked as rejected. It is contemplated that a single counterexample will render the rule invalid. If a rule has been validated by a sufficiently large number of examples and there are no counter examples, the rule may be activated, that is, the web crawler will henceforth use it to normalize newly discovered URLs, test whether the normalized URL has already been added to a "URL chunk" (the set of URLs that is being scheduled for download by the web crawler), and add only those URLs to a crawl chunk that are new even after normalization. As a result, the web crawler will avoid multiple downloads of substantially similar documents.

Figure 3:
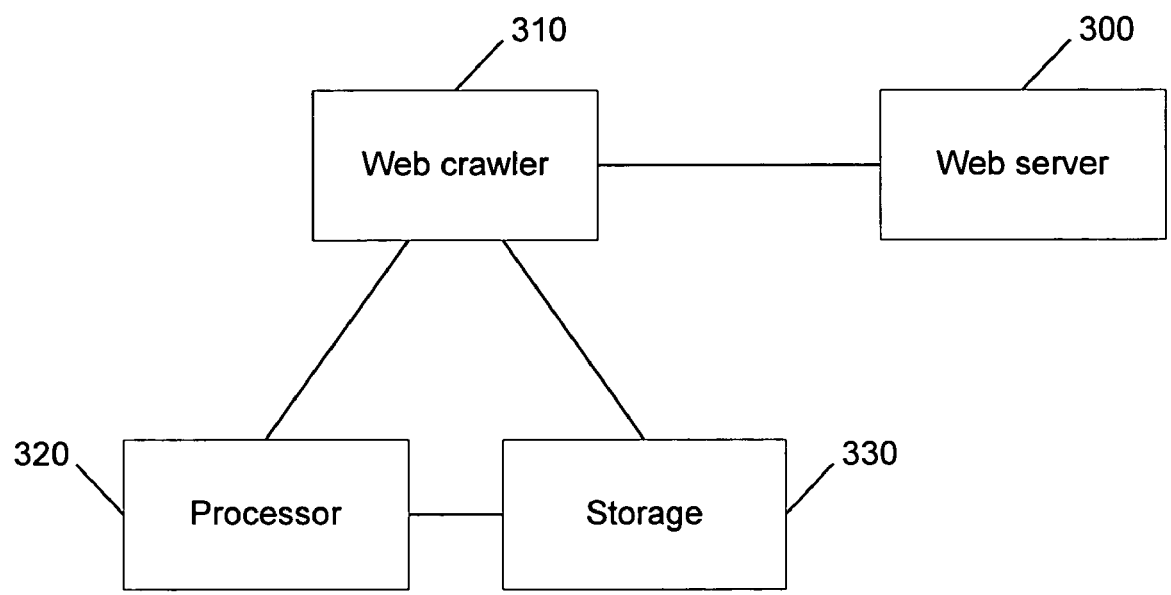
FIG. 3 is a block diagram of an exemplary system that identifies duplicate documents, web resources, or web pages in accordance with the present invention.

FIG. 3 is a block diagram of an exemplary system that identifies duplicate web pages in accordance with the present invention. A web crawler 310 accesses a web server 300 for content such as web pages. The web pages are provided to a processor 320 and a storage device 330, for analysis and storage. The web pages may be analyzed by the processor 320 as set forth above with respect to FIGS. 1 and 2, for example. Equivalence classes and rules may be stored in the storage device 330.

EXAMPLE COMPUTING ENVIRONMENT

Figure 4:
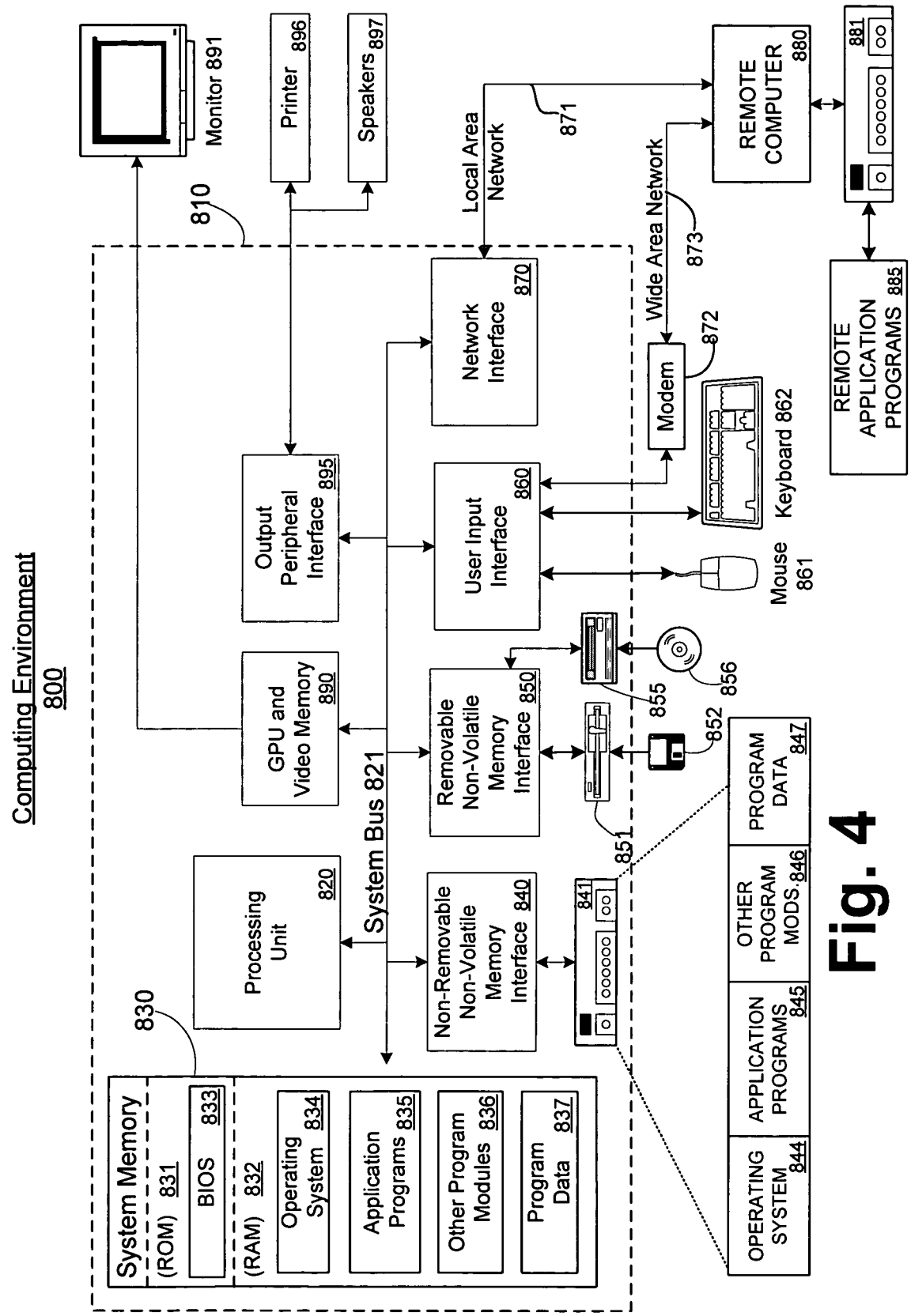
FIG. 4 is a block diagram showing an example computing environment in which aspects of the invention may be implemented.

FIG. 4 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 4 thus illustrates an example of a suitable computing system environment 800 in which the invention may be implemented, although as made clear above, the computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

With reference to FIG. 4, an example system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 830 includes computer storage media in the form of volatile and/or nonvolatile memory such as ROM 831 and RAM 832. A basic input/output system 833

(BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 4 illustrates operating system 834, application programs 835, other program modules 836, and program data 837. RAM 832 may contain other data and/or program modules.

The computer 810 may also include other removable/non-removable, volatile/nonvolatile computer storage media. By way of example only, FIG. 4 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 4 provide storage of computer readable instructions, data structures, program modules and other data for the computer 810. In FIG. 4, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to monitor 891, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 4. The logical connections depicted in FIG. 4 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 4 illustrates remote application programs 885 as residing on memory device 881. It will be appreciated that the network connections shown are exemplary and other means of establishing a communications link between the computers may be used.

One of ordinary skill in the art can appreciate that a computer 810 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A method for determining a rule applicable to uniform resource locators (URLs) corresponding to a plurality of web resources, comprising:
   analyzing the content of web resources from at least one web site;
   grouping web resources by content so that each group comprises all of the web resources from the at least one web site that have substantially identical content, wherein each group of substantially identical web resources is referred to as an equivalence class;
   analyzing URLs corresponding to all substantially identical web resources in an equivalence class to determine a per equivalence class URL rewrite rule applicable to the URLs;
   analyzing the per equivalence class URL rewrite rule compared to at least one other per equivalence class URL rewrite rule for at least one different equivalence class to determine a trans-equivalence class URL rewrite rule; and
   applying the trans-equivalence class URL rewrite rule to additional web resources from the at least one website to predict that different URLs reference substantially identical web resources, thereby avoiding a plurality of references to or downloads of substantially identical web resources.

2. The method of claim 1, wherein analyzing the URLs corresponding to an equivalence class comprises identifying what portions of the URLs are essential to identify the substantially identical content, and what portions are irrelevant.

3. The method of claim 1, wherein analyzing URLs corresponding to an equivalence class to determine a per equivalence class rule comprises determining what portions of the URLs corresponding to the substantially identical web resources in the equivalence class are relevant to select the substantially identical content and what portions are not.

4. The method of claim 1, further comprising: testing the trans-equivalence class rule by applying it to the plurality of equivalence classes to identify errors, and if there are no errors, then activating it for use by a web crawler to avoid downloading duplicative web resources.

5. The method of claim 1, wherein the per equivalence class rule is based on a recurring pattern in the URLs corresponding to the substantially identical web resources in the equivalence class.

6. The method of claim 1, wherein analyzing the content comprises comparing the content in the web resources.

7. The method of claim 6, wherein analyzing the content comprises at least one of shingling, check-summing, and lexical comparison.

8. The method of claim 1, further comprising testing the per equivalence class rule.

9. The method of claim 1, further comprising receiving the web resources from a web server prior to analyzing.

10. A system for determining a rule applicable to uniform resource locators (URLs) corresponding to a plurality of web resources, comprising:
    a web crawler to receive the web resources from at least one web site on a web server; and
    a processor to receive the content of the web resources, grouping web resources by content so that each group comprises all of the web resources from the at least one web site that have substantially identical content, wherein each group of substantially identical web resources is referred to as an equivalence class, analyzing URLs corresponding to all substantially identical web resources in an equivalence class to determine a per equivalence class URL rewrite rule applicable to the URLs; analyzing the per equivalence class URL rewrite rule compared to at least one other per equivalence class URL rewrite rule for at least one different equivalence class to determine a trans-equivalence class URL rewrite rule; and applying the trans-equivalence class URL rewrite rule to additional web resources from the at least one website to predict that different URLs reference substantially identical web resources, thereby avoiding receipt by the web crawler of substantially identical web resources.

11. The system of claim 10, wherein the processor is adapted to analyze the URLs corresponding to an equivalence class to identify what portions of the URLs are essential to identify the substantially identical content, and what portions are irrelevant.

12. The system of claim 10, wherein analyzing URLs corresponding to an equivalence class to determine a per equivalence class rule comprises determining what portions of the URLs corresponding to the substantially identical web resources in the equivalence class are relevant to select the substantially identical content and what portions are not.

13. The system of claim 12, wherein the processor is further adapted to: test the trans-equivalence class rule by applying it to the plurality of equivalence classes to identify errors, and if there are no errors, then activate it for use by the web crawler to avoid downloading duplicative web resources.

14. The system of claim 10, wherein the processor is adapted to search for a recurring pattern in the URLs corresponding to the substantially identical web resources in the equivalence class.

15. The system of claim 14, wherein the processor is adapted to perform at least one of shingling, check-summing, and lexical comparison.

16. A method for determining a rule applicable to uniform resource locators (URLs), comprising:
    grouping web resources on a web server according to substantially identical content, wherein each group of substantially identical web resources is referred to as an equivalence class;
    analyzing URLs addressing all substantially identical web resources in an equivalence class;
    constructing a per equivalence class URL normalization rule applicable to the URLs corresponding to all substantially identical web resources in the equivalence class;
    analyzing the per equivalence class URL normalization rule compared to at least one other per equivalence class URL normalization rule for at least one different equivalence class to determine a trans-equivalence class URL normalization rule; and
    applying the trans-equivalence class URL normalization rule to additional web resources to predict that different URLs reference substantially identical web resources, thereby avoiding a plurality of references to or downloads of substantially identical web resources.

17. The method of claim 16, wherein constructing the per equivalence class URL normalization rule comprises pattern matching.

18. The method of claim 16, further comprising validating the per equivalence class URL normalization rule.

19. The method of claim 16, wherein grouping web resources on a web server according to substantially identical content comprises at least one of shingling, check-summing, and lexical comparison.

* * * * *